Patented Sept. 4, 1945

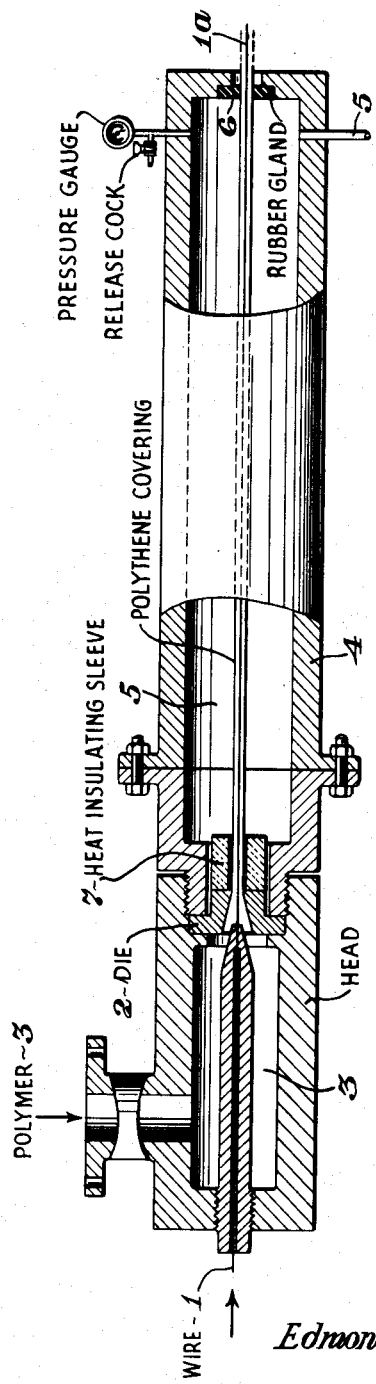
Edmond G. Williams INVENTOR.

2,384,224

UNITED STATES PATENT OFFICE 2,384,224

EXTRUSION OF THERMOPLASTIC MATERIALS

Edmond George Williams, Northwich, England, assignor to Imperial Chemical Industries Limited, a corporation of Great Britain Application November 3, 1942, Serial No. 464,383
In Great Britain November 3, 1941

4 Claims. (Cl. 18—59)

This invention relates to improvements in the processing of thermoplastic materials, and more particularly to the manufacture of electric cables by extrusion.

It is known that articles such as rods, insulated wires, cables and other coated objects, can be made by extruding a thermoplastic composition at an elevated temperature, if desired over a base such as a wire, so that a coherent rod, coating or the like is formed, and allowing it to cool. Such methods are applicable to a wide variety of thermoplastic materials, and the present invention concerns the use of thermoplastic materials in making extruded sections which are sufficiently stiff to resist deformation by atmospheric pressure when cold, and which contract during the cooling of the hot extruded material.

When extruding a comparatively thick layer of these materials in one layer on the large scale, it is difficult to prevent the formation of bubbles or voids, particularly bubbles or voids round a central conductor wire covered with a thermoplastic covering of circular cross section. A similar difficulty is encountered in the injection moulding of these materials, and in that case it is overcome by continuing the injection during cooling. Such a method is not applicable to the extrusion of rods or coated wires. For coated wires the difficulty of void formation may often be overcome by applying the thermoplastic material in several thin layers, and by cooling it very slowly, but these methods are tedious in large scale manufacture.

The object of the present invention is to provide a method of preparing thick articles or coatings free from bubbles or voids in fewer operations than has hitherto been possible, with a comparatively high rate of cooling.

According to the present invention we manufacture rods, coated wires, insulated cables and extruded sections from thermoplastic materials by a process which comprises extruding or otherwise shaping the thermoplastic material at a temperature above its softening point, if desired on a base such as a wire or electrical conductor, and subsequently cooling the whole while subjecting it to an external pressure. Another feature of the invention is the provision of a pressure-cooling chamber or tube in which the cooling may be carried out at a high rate without the formation of bubbles or voids.

The formation of bubbles or voids during rapid cooling of thick sections without the application of external pressure is due, we believe, to the formation of a stiff outer film of the thermoplastic material before the inner part or core has solidified or cooled. The subsequent solidification and/or cooling causes contraction, and when the outer film is too stiff to collapse under the forces created this causes void formation.

Although the invention is applicable to all methods of making rods, coated wires, insulated cables and the like, it is chiefly of value in the extrusion of these articles and extruded sections. An extrusion process offers the advantages of ease and continuity of operation and gives a uniform product.

The drawing represents an elevation, partly in section, of apparatus for carrying out the process of the invention.

In a typical manner of carrying out the invention which is illustrated by reference to polythene as the thermoplastic material and by reference to the drawing, a copper wire 1 is drawn through a die 2 which is also fed with normally solid polythene 3 at a temperature above 110° C. If the polythene is at a temperature above that at which appreciable decomposition readily occurs, it must only be maintained at such a high temperature for a short time so that the amount of decomposition is negligible. When extruded through the die 2, the wire 1 is covered with a continuous layer of polythene in the softened condition. It is then subjected to cooling in a tube or chamber 4 which is under pressure. This may be done, for example, by passing it through a pressure tube 4 through which a cooling medium 5 such as air or water under pressure is also passed. The cooled coated wire 1a when drawn through this chamber has a continuous coating of polythene on it which is free from bubbles.

Another application of this invention is the manufacture of a rod of thermoplastic material by passing a material such as polythene through a die at a temperature above its softening point, and drawing the rod through a cooled pressure tube where it is cooled by contact with air, water or other cooling medium under pressure.

In the preferred form of apparatus for carrying out the process of this invention as illustrated by the drawing, the cooled pressure chamber or tube 4 is attached at one end directly to the die 2, and the other end may have a gland 6 through which the cooled rod or coated wire 1a may be drawn. The air, water or other cooling medium 5 may escape through this gland 6 or through a suitable orifice.

Clearly the die 2 must not be cooled to a temperature which is too low to give satisfactory extrusion, and it is sometimes desirable, particularly when a liquid such as water is used as cooling medium and the cooling chamber 4 is near to or adjacent to the die 2, to provide a lock or baffle 7 which prevents cold water flowing around the die.

The invention is applicable to all thermoplastic materials which may be extruded and which contract during cooling and/or solidification to give a solid which is not readily collapsible. It may be used with high molecular weight solid polymers and other synthetic substances and also with naturally occurring materials. Examples of such materials are polythene of molecular weight 10,000, polyisobutylene of molecular weight 100,000, plasticised polyvinyl chloride, interpolymers of styrene and isobutylene, plasticised ethyl cellulose, gutta-percha, and compatible mixtures containing these substances. By compatible mixtures is meant mixtures which remain homogeneous on cooling and do not segregate into two or more solid phases. Some of these materials undergo as much as 15% contraction in volume when cooling to room temperature from the hot plastic state in which they are extruded. Thus rapid cooling of a 5–10 mm. diameter rod without the application of external pressure may give a rod in which there are frequent voids or bubbles up to and even exceeding 1 mm. diameter.

The minimum pressure which may be employed in the pressure cooling chamber depends, inter alia, on the rate of cooling, the thickness of the thermoplastic material and the temperature range through which it must be cooled. I have found that when coating wires with a layer of polythene of 2½ mm. thickness at a temperature of about 130° C., the coated wire may be cooled without the formation of voids or bubbles by drawing it at a rate of 10 feet per minute through a tube 8 feet long through which cold air is blown, while maintaining the air pressure in the tube at 10 lbs. per sq. inch above atmospheric pressure. Much higher pressures, such as 200 lbs. per sq. inch, may be employed if desired, but when the chamber is directly attached to the die the pressure in the chamber must not exceed the extrusion pressure. With a screw extrusion machine this may be about 300 lbs. per sq. inch, but with piston operated extrusion machines even higher pressures may be employed. With high pressures, high rates of cooling may be employed.

The advantages of preventing the formation of voids in the products depend on the nature of the products and on the uses to which they are to be put. Thus, rods may display weaknesses or blemishes at the positions where the voids appear. Covered wires may have gaps in the covering or between the covering and the wire, which may not only be responsible for weaknesses in the covering but are objectionable when the wire is to be used as a high voltage cable as the voids are regions where ionisation and consequent damage to and breakdown of the insulation may occur.

The invention is illustrated but not restricted by the following examples.

Example 1

A copper wire of diameter 1.2 mm. is covered with a concentric circular covering of polythene (made as disclosed in Specification 471,590) to an overall diameter of 7 mm., by passing the wire at 10 feet per minute through the die of a screw extrusion machine at a temperature of 130° C., the required thickness of polythene being forced through the die simultaneously. An 8 foot tube is attached to the die and the covered wire is drawn through this and out through a gland at the far end. Compressed air is admitted to the tube at a pressure of 25 lbs. per sq. inch above atmospheric pressure and allowed to leak slowly through the gland. The covering on the wire has set solid on emerging from the cooling tube, and the covering is free from voids or bubbles.

For comparison, in a similar extrusion process in which air is blown through the tube at atmospheric pressure to cool and solidify the covering, small bubbles and voids are found in those parts of the covering in contact with the wire.

Example 2

A copper wire of diameter 2 mm. is covered with a circular covering of gutta-percha to an overall diameter of 2 cm. by passing the wire through the die of a hydraulically operated piston extrusion machine heated to 120° C., the gutta-percha being forced out of the die at the appropriate rate to give the required diameter over the wire. The covered wire is drawn through a tube 20 feet long containing water under a pressure of 150 lbs. per sq. inch, passing out through a pressure retaining gland, the other end of the tube being attached to the die.

Example 3

A mixture of 4 parts by weight of polythene of molecular weight 15,000 and 1 part of polyisobutylene of molecular weight 100,000 is continuously extruded from the die of a screw extrusion machine heated to 140° C. in the form of a rod of circular cross section 1 cm. in diameter. The rod is cooled by drawing it through a 15 foot metal tube attached to the die and passes out through a gland at the far end. Cold compressed air at a pressure of 50 lbs. per sq. inch is passed into the tube and out through a pressure controlling valve.

What I claim is:

1. A process of manufacturing wire coated with a normally solid polymer of ethylene which comprises passing the wire and polymer of ethylene which is at a temperature of approximately 130° C. through a die at a rate of at least 10 ft. per minute whereby the wire is uniformly coated with a substantial thickness of the polymer of ethylene and subsequently cooling the thus coated wire by passing it in contact with cool water through a bath of at least eight feet in length under a pressure between 20 to 200 pounds per square inch.

2. A process of manufacturing wire insulated with a coating of a normally solid thermoplastic material which comprises passing the wire and extruding the thermoplastic material in a plastic state through a die wherein the wire is coated with the thermoplastic and substantially immediately thereafter cooling the thus coated wire in a bath wherein the wire is subjected to an external pressure of at least 10 lbs. per square inch. but below the extrusion pressure. for at least about 0.8 minute.

3. A process of manufacturing wire insulated with a coating of a normally solid polymer of ethylene which comprises passing the wire and the normally solid polymer of ethylene in a plastic state through a die wherein the wire is coated with the polymer of ethylene and substantially immediately thereafter cooling the thus coated wire in a water bath wherein the wire is subjected to an external pressure of at least 10 lbs. per square inch, but below the extrusion pressure, for at least about 0.8 minute.

4. A process of manufacturing wire insulated with a coating of a normally solid polymer of ethylene having a molecular weight of at least 10,000 which comprises passing the wire and a polymer of ethylene with a molecular weight of at least 10,000 in a molten state through a die whereby the wire is coated with the polymer of ethylene to give a coating of about 2.9 mm. in thickness and substantially immediately thereafter cooling the thus coated wire in an aqueous bath at a temperature between 120 and 140° C. wherein the wire is subjected to an external pressure of about 10 lbs. per square inch for at least 0.8 minute.

EDMOND G. WILLIAMS.